(12) United States Patent
Kim

(10) Patent No.: US 11,400,593 B2
(45) Date of Patent: Aug. 2, 2022

(54) METHOD OF AVOIDING COLLISION, ROBOT AND SERVER IMPLEMENTING THEREOF

(71) Applicant: LG ELECTRONICS INC., Seoul (KR)

(72) Inventor: Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 16/874,269

(22) Filed: May 14, 2020

(65) Prior Publication Data
US 2021/0138647 A1 May 13, 2021

(30) Foreign Application Priority Data

Nov. 11, 2019 (KR) ........................ 10-2019-0143449

(51) Int. Cl.
| | |
|---|---|
| *B25J 19/02* | (2006.01) |
| *B25J 9/16* | (2006.01) |
| *B25J 13/08* | (2006.01) |
| *G05D 1/02* | (2020.01) |

(52) U.S. Cl.
CPC .......... *B25J 9/1666* (2013.01); *B25J 13/089* (2013.01); *B25J 19/023* (2013.01); *G05D 1/0238* (2013.01); *G05D 1/0274* (2013.01)

(58) Field of Classification Search
CPC ...... B25J 9/1666; B25J 9/1605; B25J 9/1682; B25J 9/1664; B25J 9/1674
USPC ........... 700/245, 255, 258; 901/1, 8; 701/23, 701/301, 25, 28, 300
See application file for complete search history.

(56) References Cited

U.S. PATENT DOCUMENTS

| | | | | |
|---|---|---|---|---|
| 2020/0278667 A1* | 9/2020 | Voorhies | ............... | G06Q 10/087 |
| 2021/0223779 A1* | 7/2021 | Passot | ..................... | G01C 21/20 |
| 2021/0232149 A1* | 7/2021 | Griffin | ................... | G16C 99/00 |
| 2021/0264572 A1* | 8/2021 | Hrabe | .................. | G05D 1/0274 |
| 2021/0302569 A1* | 9/2021 | Lincoln | ............... | G01S 13/9043 |

* cited by examiner

*Primary Examiner* — Dalena Tran
(74) *Attorney, Agent, or Firm* — KED & Associates, LLP

(57) ABSTRACT

The present disclosure relates to a method for avoiding collision and a robot and a server implementing such method, and according to an embodiment of the present disclosure, the robot includes a sensor configured to sense a distance between the robot and an object disposed outside, a communicator configured to receive, from the sensor or the second robot, position information of the second robot, and a controller configured to generate a moving path to avoid the collision based on at least one of position information of the second robot or distance information sensed by the sensor and depth information of a recessed part of the second robot.

20 Claims, 16 Drawing Sheets

FIG. 5
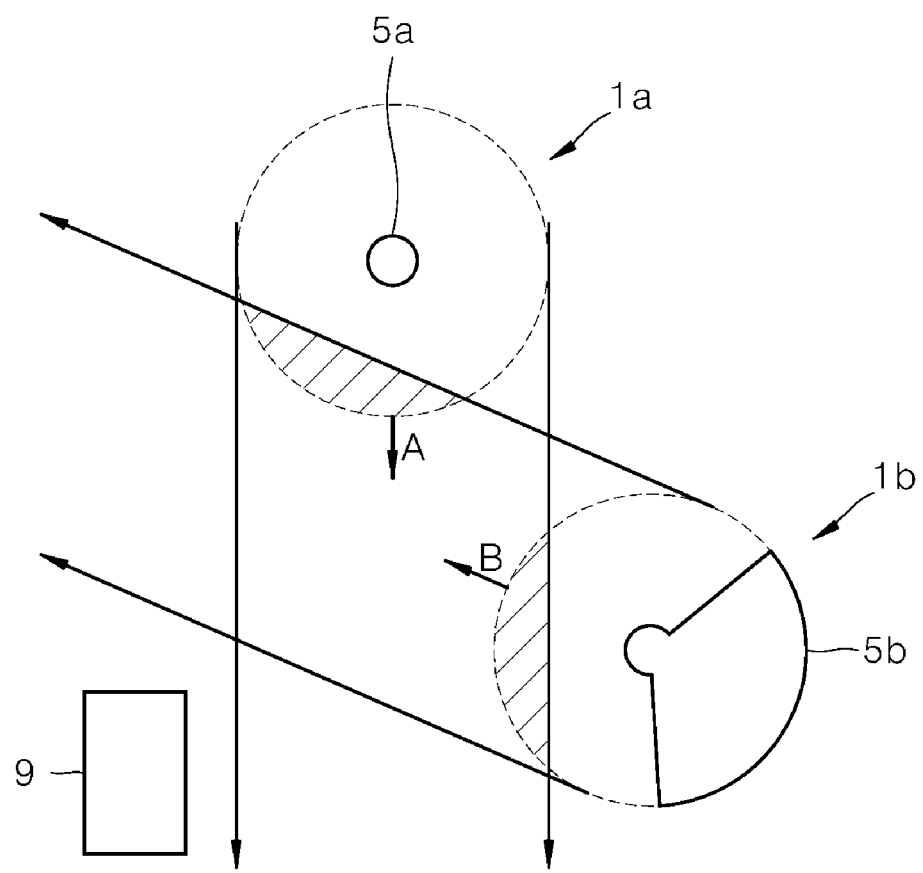
 : CONTOUR OF LOWER PORTION OF EACH OF ROBOTS

FIG. 14
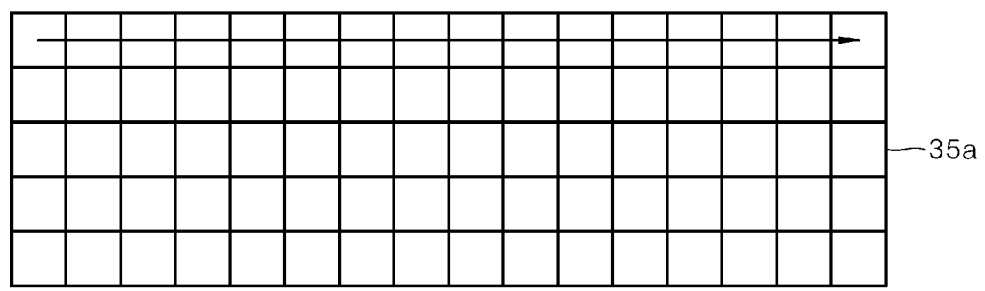
—35a
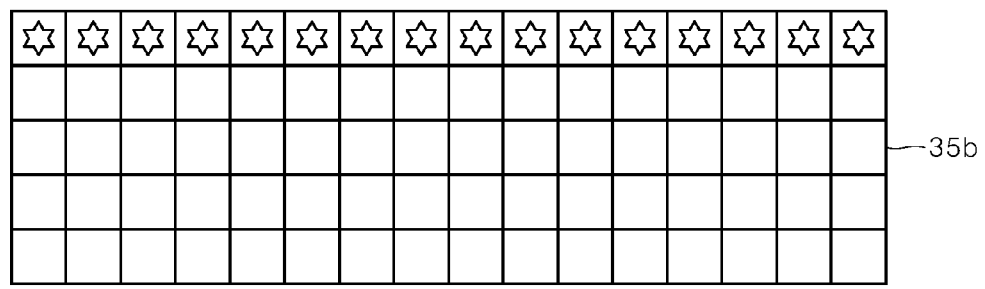
—35b
☆ : POSITION OF OBSTACLE
| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 3 | 3 | 3 | 3 | 3 | 3 | 3 | 3 | 3 | 3 | 3 | 3 | 3 | 3 | 3 | 3 |
| 5 | 5 | 5 | 5 | 5 | 5 | 5 | 5 | 5 | 5 | 5 | 5 | 5 | 5 | 5 | 5 |
| 7 | 7 | 7 | 7 | 7 | 7 | 7 | 7 | 7 | 7 | 7 | 7 | 7 | 7 | 7 | 7 |
| 9 | 9 | 9 | 9 | 9 | 9 | 9 | 9 | 9 | 9 | 9 | 9 | 9 | 9 | 9 | 9 |
—35c

METHOD OF AVOIDING COLLISION, ROBOT AND SERVER IMPLEMENTING THEREOF

CROSS-REFERENCE TO RELATED APPLICATION

This application claims priority under 35 U.S.C. § 119 to Korean Application No. 10-2019-0143449 filed on Nov. 11, 2019, whose entire disclosure is hereby incorporated by reference.

BACKGROUND

1. Field

The present disclosure relates to a method of avoiding collision and a robot and a server implementing such method.

2. Background

A large-scale retail store, a department store, an airport, a golf course, and the like are places where exchange of goods and services takes place between people. Robots may be useful in the places to offer information or convenience to people. Robots may be classified as guide robots, security robots, cleaning robots and the like. The robots move in a space, identifying their positions.

In some examples, a number of robots may be useful in the space to improve performance of operation and a plurality of robots having the same shape or the same structure may be disposed in the same space. The robots with sensors may move. In some cases where the sensors are disposed at the same position of the robot, interference between the sensors may occur or the robots may incorrectly avoid obstacles. Accordingly, there is a need for a technique for preventing incorrect operation to avoid obstacles using sensors by robots having the same structure, the same shape, or the similar structures or similar shapes.

BRIEF DESCRIPTION OF THE DRAWINGS

The embodiments will be described in detail with reference to the following drawings in which like reference numerals refer to like elements wherein:

FIG. 5 shows an example process of moving robots in a space in which a plurality of robots including recessed parts are disposed according to an embodiment of the present disclosure.

FIGS. 13 and 14 show example processes of generating a path to avoid collision according to an embodiment of the present disclosure.

DETAILED DESCRIPTION

Figure 1:
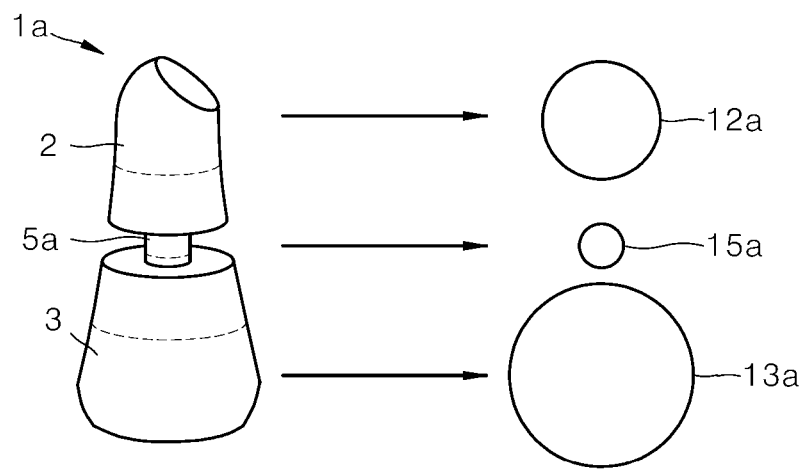
FIG. 1 shows example appearance of a robot according to an embodiment of the present disclosure.

FIG. 1 shows an example of an appearance of a robot according to an embodiment of the present disclosure. The robot is described as a circular pillar shape for the convenience of explanation, and the robot's shape of FIG. 1 is an exemplary embodiment of the present disclosure. Referring to FIG. 1, a sensor is disposed in the robot. A robot of recessed type is a robot in which a portion of the appearance of the robot is recessed and the sensor is disposed in the recessed part. The sensor may be disposed in the concave part or depressed part or recessed part of the robot. The recessed part includes concave part, and depressed part.

Reference numeral 1a of FIG. 1 shows a robot including a recessed part at a portion thereof. The robot includes an upper portion 2, a lower portion 3, and a recessed part 5a. In some examples, the robot may include a recessed part or may not include a recessed part. In some cases where the robot does not include the recessed part, the robot according to an embodiment of the present disclosure may distinguish another robot including a recessed part from an obstacle.

The configuration of a robot including the recessed part is described below. The lower portion 3 may include wheels or caterpillars that enable moving the robot 1a, or walking apparatuses such as two-leg walking apparatuses and three-leg walking apparatuses, and the like. The upper portion 2 may include components for an interface such as a display device and a speaker. Alternatively, the lower portion 3 may also include components for an interface such as a display device and a speaker.

A sensor is disposed in the recessed part 5a to detect an obstacle disposed around the robot. The recessed part 5a is disposed between the upper portion 2 and the lower portion 3 and an area of a cross section 15a is less than an area of a cross section 12a of the upper portion 2. The area of the cross section 15a of the recessed part 5a is less than the area of a cross section 13a of the lower portion 3. The robot shown in FIG. 1 includes the recessed part 5a and the recessed part 5a has a circular pillar, and may also have a square pillar or a triangular pillar.

Figure 2:
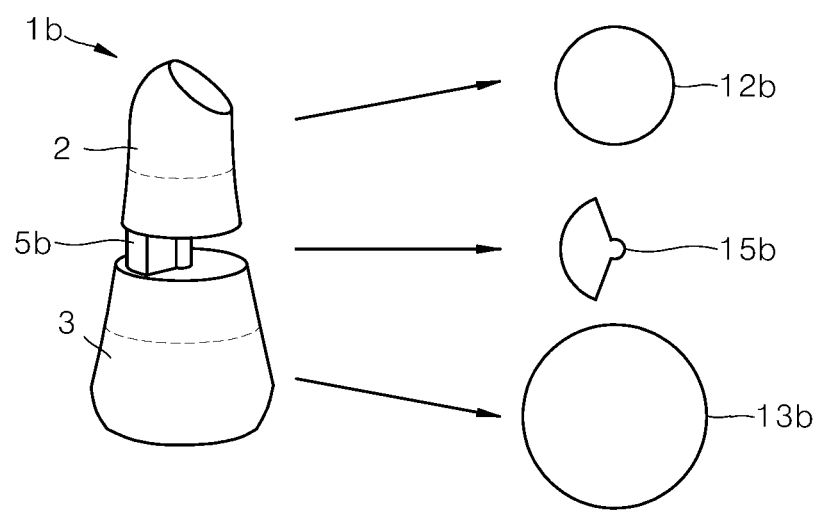
FIG. 2 shows example appearance of a robot according to an embodiment of the present disclosure.

FIG. 2 shows example appearance of a robot according to an embodiment of the present disclosure. A first area of a recessed part 5b contacts an upper portion 2 and a lower portion 3 and a second area of the recessed part 5b is recessed. Cross sections thereof are described below in detail. A cross section 15b of the recessed part 5b has a fan shape. An area of the cross section 15b of the recessed part 5b is less than an area of a cross section 12b of the upper portion 2. The area of the cross section 15b of the recessed part 5b is less than the area of the cross section 13b of the lower portion 3. In some cases where the robot does not include the recessed part, in contrast to FIGS. 1 and 2, another robot that moves in the space where the robot moves may include a recessed part.

Figure 3:
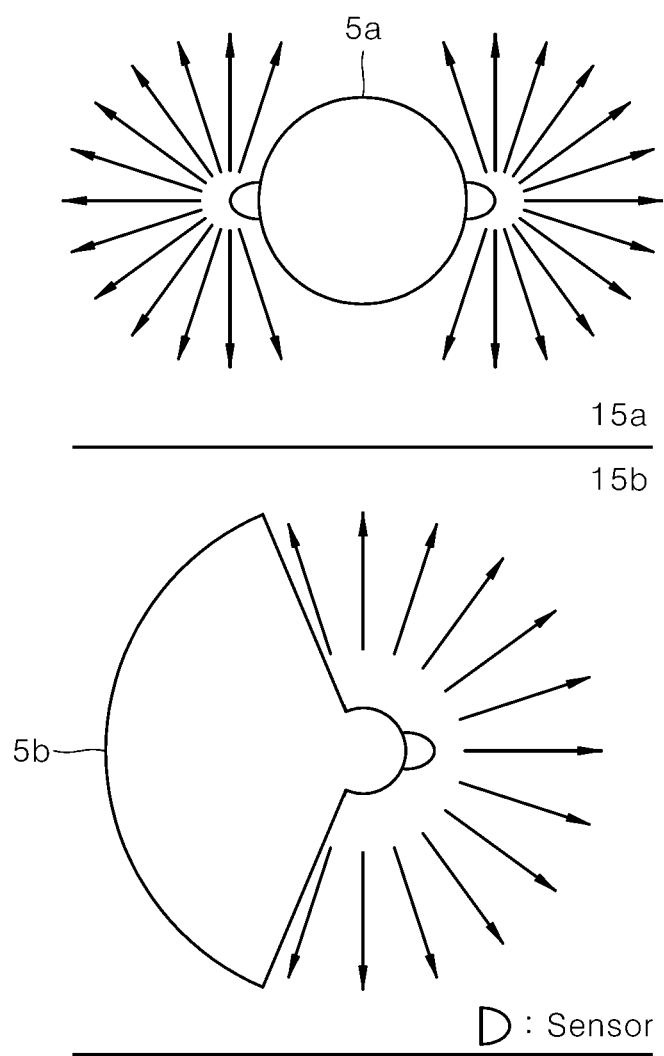
FIG. 3 shows an example sensor disposed in a recessed part according to an embodiment of the present disclosure.

FIG. 3 shows an example sensor disposed in a recessed part according to an embodiment of the present disclosure. A cross section 15a of a recessed part 5a in FIG. 1 and the cross section 15b of the recessed part 5b in FIG. 2 are referred to. Reference numeral 15a shows an enlarged cross section of the recessed part 5a in which sensors are disposed at both sides of the recessed part 5a. Arrows show sensible directions of sensors, and the sensible direction that may be sensed by sensors. Reference numeral 15a shows sensing in 360 degrees.

Reference numeral 15b shows an enlarged cross section of a recessed part 5b in which a sensor is disposed at one side of the recessed part 5b. Arrows show directions in which the sensor may sense. Reference numeral 15b shows sensing in 220 degrees.

As shown in FIG. 3, the robot including the recessed part may sense another adjacent obstacle during movement using a sensor. Examples of the sensor include various types of sensors such as ultrasonic sensors, infrared sensors, LiDAR sensors, laser sensors, and time-of-flight (TOF) sensors.

Figure 4:
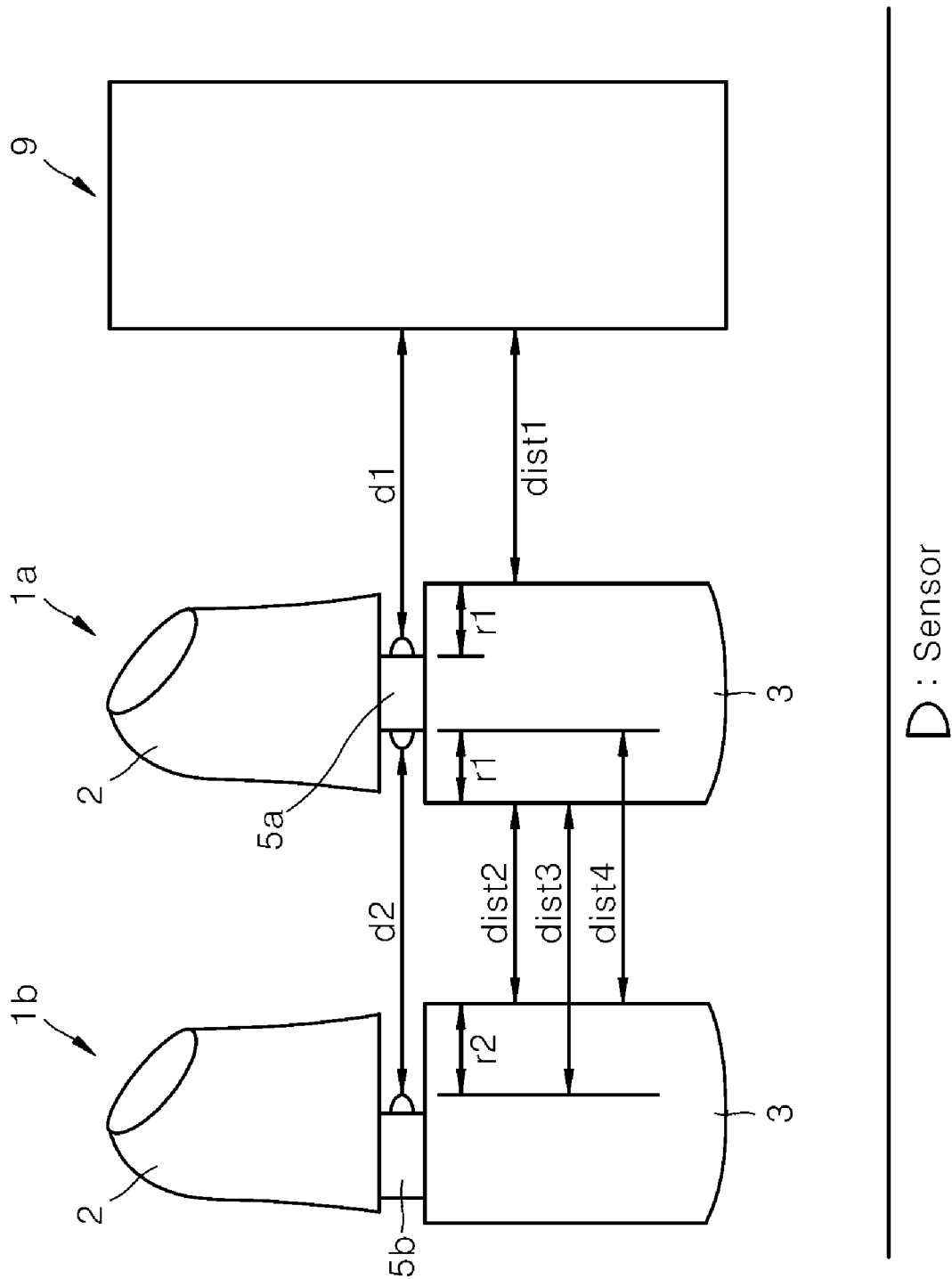
FIG. 4 shows example incorrect sensing that occurs in a space where a plurality of robots are disposed, where the robots include recessed parts at the same height according to an embodiment of the present disclosure.

A plurality of robots having the same shape may be disposed in a space or a plurality of robots defining the recessed parts at the same height may be disposed. In this case, the robot may incorrectly sense a position of another robot due to the same height of the recessed parts of the robots. FIG. 4 shows example incorrect sensing occurring in a space in which a plurality of robots defining the recessed parts at the same height is disposed according to an embodiment of the present disclosure. Side surfaces are shown in FIG. 4.

Reference numeral 1a corresponds to a side surface of the robot shown in FIG. 1. Reference 1b corresponds to a side surface of the robot shown in FIG. 2. Sensors are disposed at both sides of a recessed part of the first robot 1a. When the sensor of the first robot 1a senses an obstacle 9, the first robot 1a determines a distance between the sensor and the obstacle 9 as distance d1. The first robot 1a may calculate dist1 using distance d1 and a value of recessed distance r1 of a recessed part 5a. For example, the first robot 1a calculates a value corresponding to dist1 (i.e., d1−r1) by subtracting distance r1 from distance d1. The first robot 1a calculates dist1 as a distance between the first robot 1a and the obstacle 9.

In some cases where the sensor of the first robot 1a senses the second robot 1b, the second robot 1b is an obstacle from a viewpoint of the first robot 1a. For example, the first robot 1a determines the second robot 1b to be the same kind of obstacle as the obstacle 9 before additional information on the second robot 1b is provided.

Therefore, the first robot 1a determines that the distance between the sensor of the first robot and the recessed part 5b of the second robot 1b is distance d2. The first robot 1a apply r1 of determines a distance between the sensor and the obstacle 9 as distance d2. The first robot 1a may calculate dist3 using distance d2 and a value of recessed distance r1 of the recessed part 5a. For example, the first robot 1a determines that dist3 (e.g., a distance corresponding to d241) which is calculated by subtracting distance r1 from distance d2 is a distance from the second robot 2b which is an obstacle disposed outside.

Distance d2 is a distance between the sensor of the first robot 1a and the recessed part 5b of the second robot 1b. A distance between a lower portion of the first robot 1a and a lower portion of the second robot 1b is dist2. Dist2 corresponds to a distance of d2−r1−r2. When the first robot 1a fails to obtain the information indicating that the second robot 1b is a robot, the first robot 1a incorrectly determines the distance between the first robot 1a and the second robot 1b as dist3.

Similarly, when the second robot 1b may not obtain information that the first robot 1a is a robot and determines that the first robot 1a is the obstacle, the second robot 1b determines the distance between the first robot 1a and the second robot 1b as dist4 (e.g., a distance corresponding to d2−r2). For example, in FIG. 4, when the first robot 1a fails to determine that the second robot 1b is the robot and the second robot 1b fails to determine that the first robot 1a is the robot, where the first robot 1a and the second robot 1b include the recessed parts at the same height, each of the first robot 1a and the second robot 1b incorrectly calculates the distance between the two robots.

FIG. 5 shows an example process of moving robots in a space in which a plurality of robots including recessed parts are disposed according to an embodiment of the present disclosure. FIG. 5 shows a cross section at a height of the recessed part. A first robot 1a senses an obstacle 9 and a second robot 1b. From a viewpoint of the first robot 1a, a second robot 1b is another obstacle. Therefore, the first robot 1a determines that a recessed part 5b of the second robot 1b is appearance of the obstacle. As a result, the first robot 1a determines that the first robot 1a may sufficiently pass between the obstacle 9 and the recessed part 5b of the second robot 1b, and moves in a direction indicated by arrow A. The first robot 1a collides with the lower portion of the second robot 1b during movement in the direction indicated by arrow A.

Similarly, the second robot 1b senses the obstacle 9 and the first robot 1a. From the viewpoint of the second robot 1b, the first robot 1a is the obstacle. Therefore, the second robot 1b determines that the recessed part 5a of the first robot 1a is the appearance of the obstacle. As a result, the second robot 1b determines that the second robot 1b may sufficiently pass between the obstacle 9 and the recessed part 5a of the first robot 1a, and moves in a direction indicated by arrow B. The second robot 1b collides with the lower portion of the first robot 1a during movement in the direction indicated by arrow B.

An embodiment in which a robot receives information on a position or a speed of another adjacent robot to prevent the collision between the robots is described herein. An embodiment is also described herein in which the robot determines a specific form of another robot during sensing of adjacent obstacle by the robot and distinguishes the robot from the obstacle.

Figure 6:
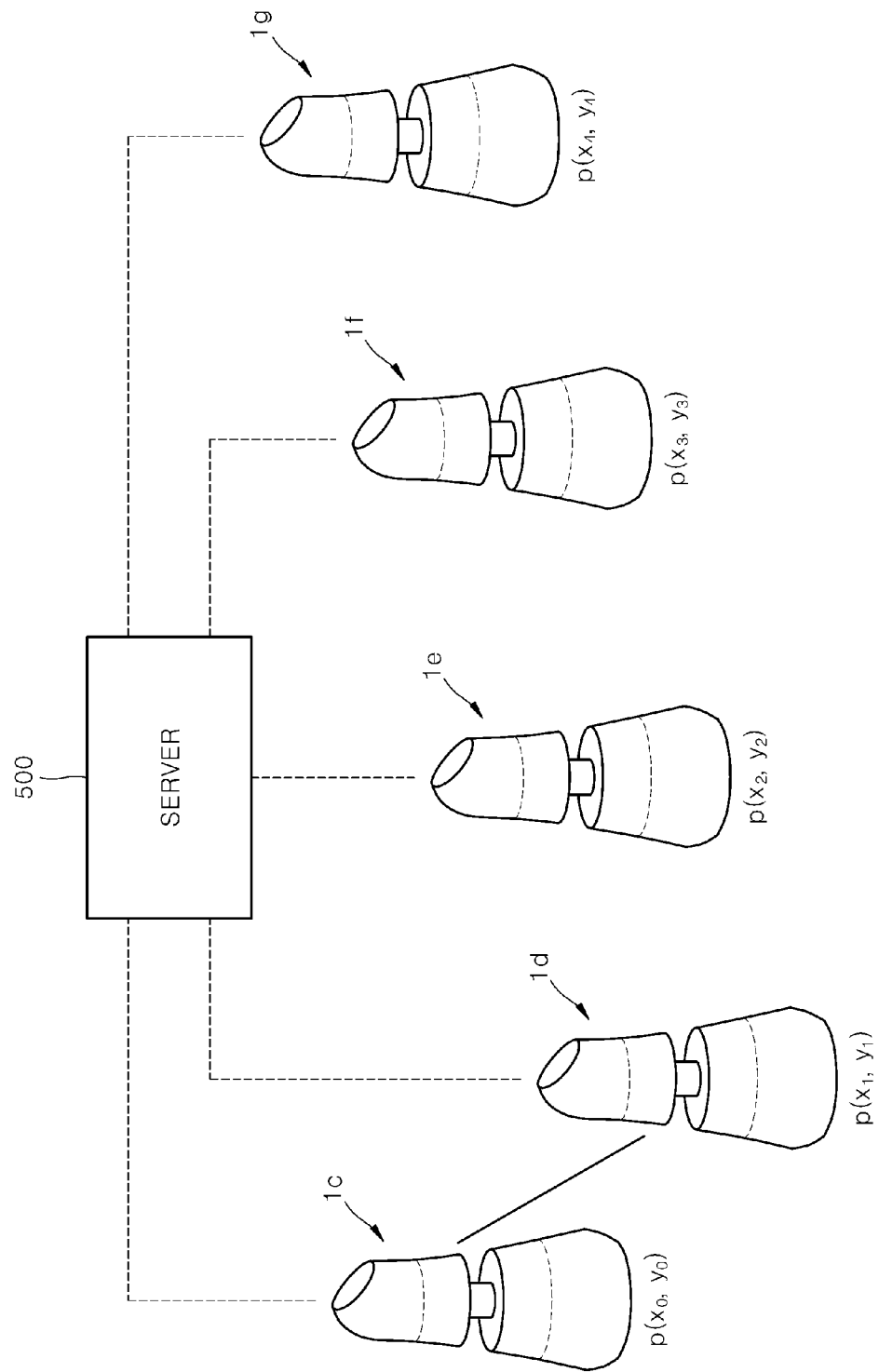
FIG. 6 shows an example server transmitting position information or moving path information to a plurality of robots according to an embodiment of the present disclosure.

FIG. 6 shows an example server transmitting position information or moving path information to a plurality of robots 1c-1g according to an embodiment of the present disclosure. The server (or computer) 500 may control robots in a space where the robots are disposed or may transmit and receive information to and from with the robots. Alternatively, the server 500 may be included in one control system. In this case, the control system may control various types of sensors (e.g., cameras) in the space and the server 500 may determine the position or the speed of each of the robots based on the information provided by the sensors. The robots may transmit position information or speed information to the server 500.

The server 500 collects the position information and the speed information from the plurality of robots and transmits the information back to the respective robots. In this case, the server 500 may not transmit the position information of all robots but may transmit the information on adjacent robots based on positions of robots.

For example, the server 500 may transmit the position information (x0, y0) of robot 1c and the position information (x1, y1) of robot 1d to the robots 1c and 1d, where the robot 1c is disposed adjacent to the robot 1d, but the server 500 may not transmit position information of each of the other robots 1e, 1f, and 1g. Similarly, the server 500 may transmit position information on position coordinate (x2, y2), (x3, y3), and (x4, y4) of the each robots 1e, 1f, and 1g to the robot 1e, 1f, and 1g, but may not transmit the position information of the other robots 1c and 1d.

Alternatively, position information may be transmitted and received between individual robots without operation of the server 500. For example, the robot transmits the position information to other adjacent robots through wireless communication such as Bluetooth® or ultra wideband (UWB) and receives the position information of other robots. Alternatively, the server 500 may not transmit additional position information, but may transmit, to the robots, information on presence of another robot within a predetermined range.

Alternatively, the server 500 may generate a moving path such that the robots do not collide with each other and transmit information on the moving paths to the robots, respectively. In this case, the server 500 may determine whether the robots may be located within an adjacent distance and generate a moving path of each of the robots.

Figure 7:
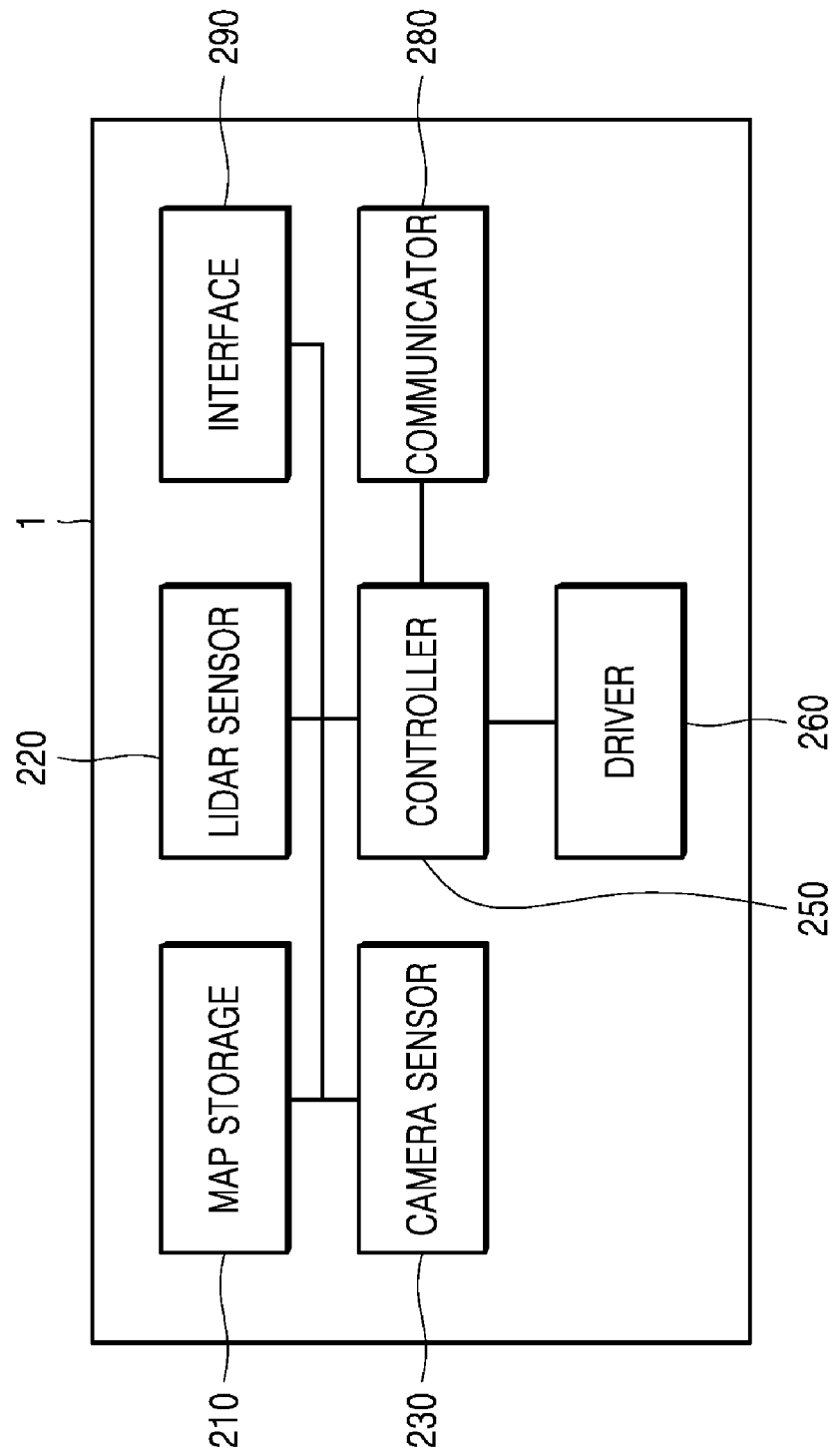
FIG. 7 shows an example robot according to an embodiment of the present disclosure.

FIG. 7 shows examples of components of a robot. The robot has various appearances and optionally includes a recessed part according to an embodiment of the present disclosure. In an embodiment of the present disclosure, a sensor is disposed in the robot to sense a distance between an object disposed outside and the robot. A LiDAR sensor as an example of the sensor is described in detail. The LiDAR sensor corresponds to an example of the sensor disposed in the robot and various types of sensors such as ultrasonic sensors, infrared sensors, laser sensors, and time-of-flight (TOF) sensors may be disposed in the robot. The LiDAR sensors may be replaced with other sensors, which are also included in the embodiments described herein.

In addition, according to an embodiment of the present disclosure, the robot may optionally include a recessed part. For example, the robot with no recessed part may include the components in FIG. 7. In addition, the robot having the components in FIG. 7 may identify another robot having the recessed part to generate an avoidance path.

The map storage (or memory) 210 stores information related to a space in which the robot moves in a map. The map storage 210 may store position information of a fixed obstacle, position information of another robot, and the like.

A LiDAR sensor 220 may sense surrounding objects two-dimensionally or three-dimensionally. A two-dimensional LiDAR sensor may sense positions of objects within 360-degree ranges with respect to the robot. LiDAR information sensed in a specific position may constitute a single LiDAR frame. For example, the LiDAR sensor 220 senses a distance between an object disposed outside the robot and the robot to generate a LiDAR frame.

As an example, a camera sensor 230 is a regular camera. To overcome viewing angle limitations, two or more camera sensors 230 may be used. An image captured in a specific position constitutes vision information. For example, the camera sensor 230 photographs an object outside the robot and generates a visual frame including vision information.

The camera sensor 230 may optionally be disposed in the robot 1. The robot 1 uses both the LiDAR sensor 220 and the camera sensor 230 to perform fusion-simultaneous localization and mapping (SLAM). The fusion SLAM may also be used in combination of LiDAR information with vision information. The LiDAR information and the vision information may be stored in the map. In an embodiment in which the robot has the recessed part, the LiDAR sensor 220, which is a kind of sensor of the robot, is disposed in the recessed part. In this case, the LiDAR sensor 220 may sense a recessed part of another robot moving within an adjacent range.

A communicator (also referred to herein as a communication module or transceiver) 280 may allow the robot 1 to communicate with another robot or an external server and to receive and transmit information. The communicator 280 receives information on another robot from the outside in order to cope with the situation. For example, the communicator 280 of the robot receives position information of another robot from a server or another robot. In one embodiment, the communicator 280 may receive information on another adjacent robot from the server 500. Alternatively, the communicator 280 may receive, from the server 500, information on a moving path configured such that the robot does not collide with another robot. Alternatively, the communicator 280 may receive, from another robot, position information or movement information of the corresponding robot.

The camera sensor 230 also photographs an object disposed outside, and the controller (or control circuitry) 250 determines whether an image of the robot is included in the captured image. As a result, the controller 250 may determine whether the object in the image is a robot or an obstacle. In this case, the controller 250 may correct the distance from the external object sensed by the LiDAR sensor 220.

A driver 260 moves the robot, such as a wheel. The controller 250 may control the driver 260 to move the robot. In a state in which a plurality of the robots in this disclosure are disposed in a service space, the robots perform specific functions (e.g., guide services, cleaning services, security services and the like). In the process, the robot 1 may store information on its position, may identify its current position in the entire space, and may generate a path required for moving to a destination.

An interface (or input/output device) 290 receives information input by a user. The interface 290 receives various pieces of information such as a touch, a voice and the like input by the user, and outputs results of the input. Additionally, the interface 290 may output a map stored by the robot 1 or may output a course in which the robot moves by overlapping on the map. Further, the interface 290 may supply predetermined information to a user.

The robot 1 may generate each map using each of the sensors (e.g., a LiDAR sensor and a camera sensor), or may generate a single map using each of the sensors and then may generate another map in which details corresponding to a specific sensor are only extracted from the single map.

The driver 260 provides the controller 250 with information on rotation, speed, and a direction of the wheel generated while the robot moves. The controller 250 may identify the current position of the robot using another sensor or the map and may accurately calculate the current position of the robot based on physical movement distance information provided by the driver 260.

The controller 250 may generate a moving path of the robot based on information stored in the map storage 210, the position information of the sensed obstacle, and the position information of another robot. Alternatively, the communicator 280 may receive information on the moving path of the robot from the server 500 and may use the information received by the controller 250.

The controller 250 generates a moving path such that the robot avoids the collision with another robot based on at least one of the position information on adjacent another robot and distance information on the distance sensed by the sensor, and depth information of the recessed part of another robot.

Figure 8:
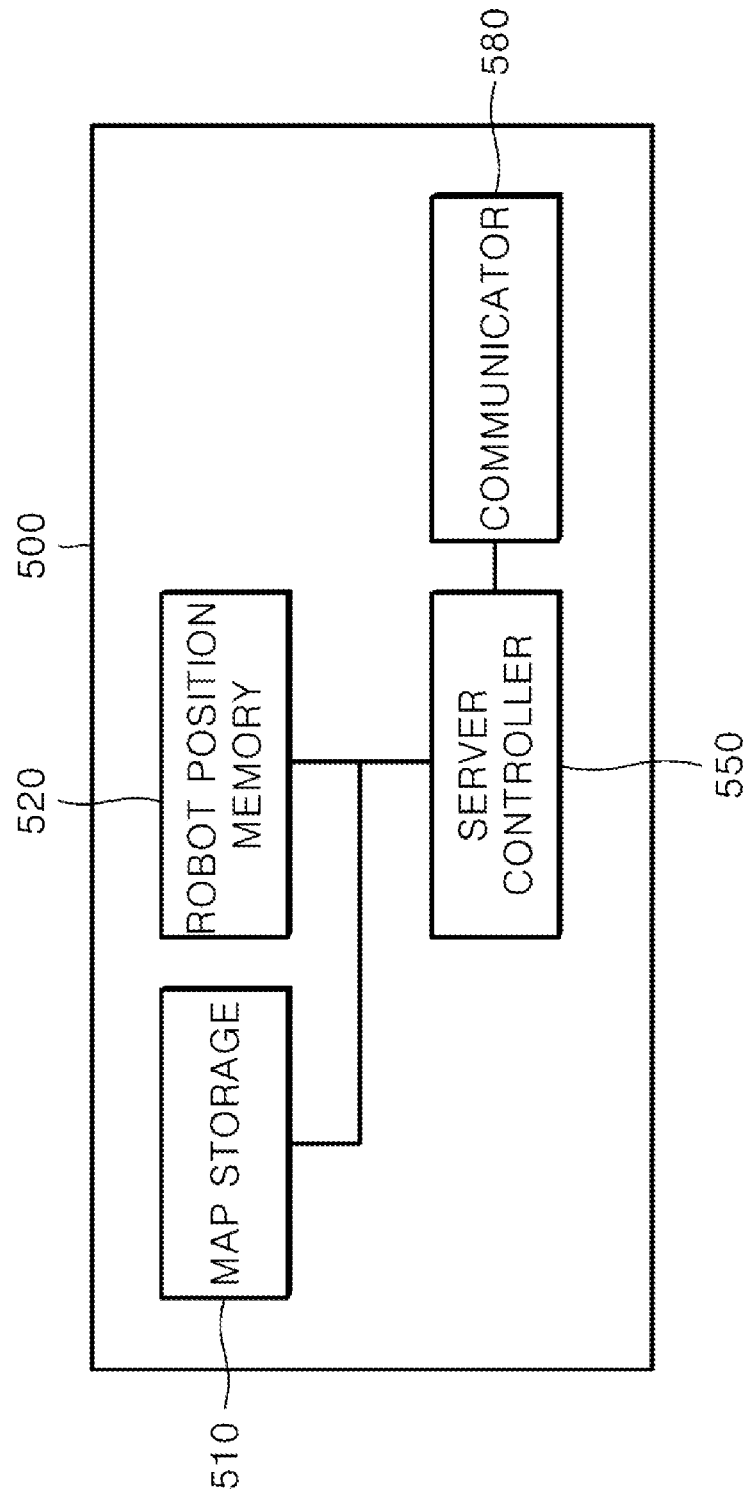
FIG. 8 shows an example server according to an embodiment of the present disclosure.

FIG. 8 shows an example of a server according to an embodiment of the present disclosure. A server (or remote computer) 500 also includes a map storage (or memory) 510 configured to store a map of the space in which robots move. A robot position memory 520 stores position information of the robots received from each of the robots or collected from various types of sensors disposed in the space where the robots are disposed.

A communicator (or transceiver) 580 may receive various pieces of information from robots and other sensors/cameras. For example, the communicator 580 may receive position information of the robots. The position information received by the communicator 580 is stored in the robot position memory 520. The communicator 580 may also transmit, to the robots, position information of other robots or may transmit a moving path generated for each robot.

The server controller 550 may generate a moving path suitable for each robot. For example, a server controller 520 calculates the positions of the robots and determines a probability of collision between the robots received by the communicator 580 to generate a detour moving path of each of the robots or to generate a moving path along which the robots move spaced apart in a same space by a maximum separation distance.

Figure 9:
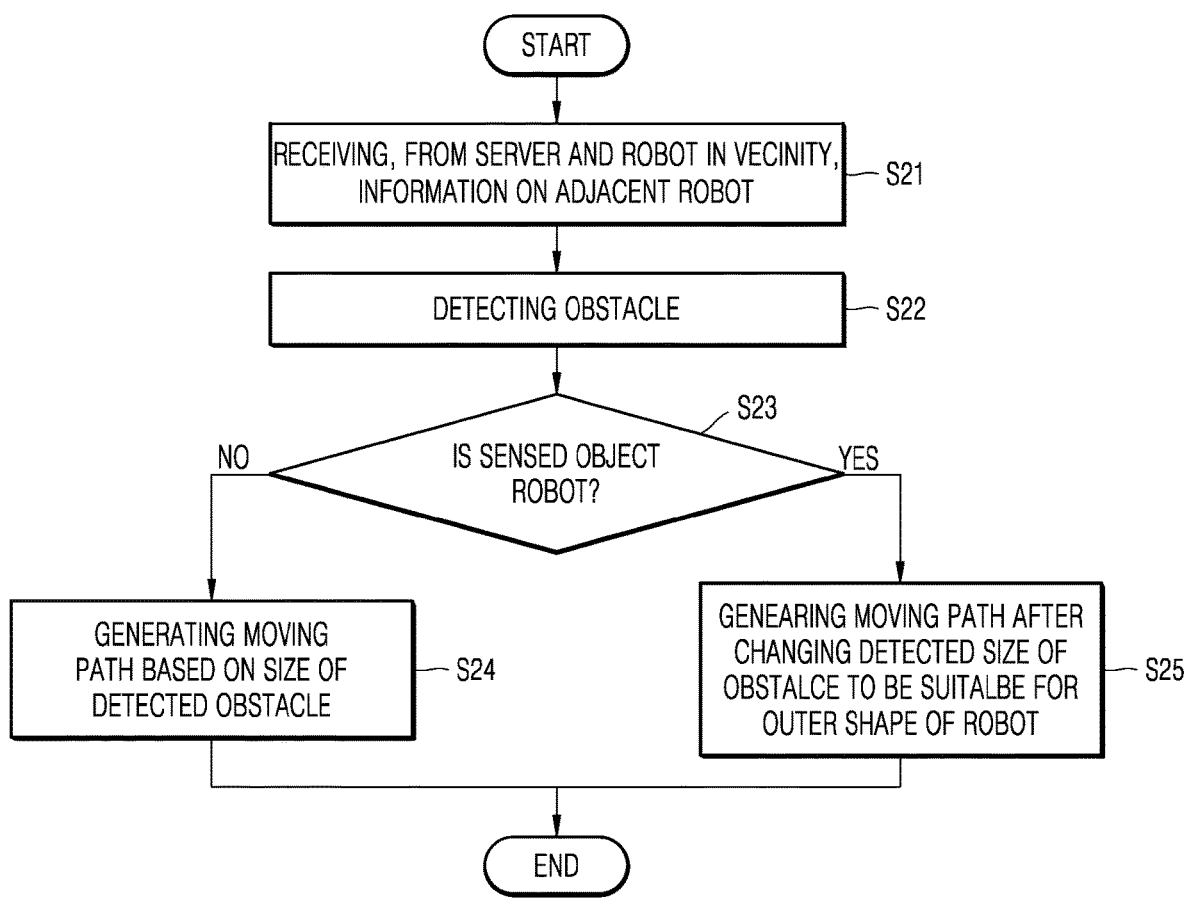
FIG. 9 shows an example process in which a robot detects an obstacle and determines whether the obstacle is a robot according to an embodiment of the present disclosure.

FIG. 9 shows an example of a process in which a robot detects an obstacle and determines whether the obstacle is a robot according to an embodiment of the present disclosure. A robot 1 receives information on an adjacent robot from a server 500 or from other robots around (S21). An example of the information received by the robot 1 includes position information of another robot. An example of the information received by the robot 1 includes information on another robot disposed within a predetermined range (e.g., within 3 meters). In another embodiment of S21, a robot 1 may wirelessly output sound of a specific frequency band. The robot may analyze the received sound to determine whether another robot is disposed around the robot.

A sensor of the robot 1, for example, a LiDAR sensor 220 detects an obstacle (S22). A controller 250 determines whether the detected obstacle is a robot (S23). The controller 250 may compare a distance between the detected obstacle and the robot 1 with position information of the robot, which is previously received, to determine whether the detected obstacle is another robot disposed adjacent to the robot. Alternatively, the controller 250 may photograph an obstacle using a camera sensor 230 and may determine whether the corresponding obstacle is a robot.

Based on the determination that the detected obstacle is not another robot, the controller 250 generates a moving path based on a size of the detected obstacle (S24). Based on the determination that the detected obstacle is another robot, the controller 250 generates a moving path after changing the size of the detected obstacle to be suitable for appearance of the robot (S25).

In some cases where the detected obstacle is another robot having the same appearance as the robot, the controller 250 corrects the previously sensed distance by reflecting the recessed distance (e.g., distance r1 or distance r4 in FIG. 4) of the recessed part. For example, in FIG. 4, the first robot 1a senses the second robot 1b and calculates the distance d2. The controller 250 of the first robot 1a may determine that a distance corresponding to "d2−r1−r2" which is calculated based on r1 which is a recessed distance of the recessed part of the first robot 1a and r2 which is a recessed distance of the recessed part of the second robot 1b is a distance between the first robot 1a and the second robot 1b and may generate a moving path.

The position information of another robot received by the robot at S21 includes information on the recessed distance of the recessed part of the robot. For example, the communicator 280 may receive position information on (x, y, depth) of another robot. "depth" is information on the recessed distance (or a depth) of the recessed part. In this case, the information on the recessed depth may be generated based on a maximum outer boundary of the robot.

In some cases where the robot does not have a vertical pillar, but has a wide portion and a narrow portion, the depth information of the recessed part may be generated based on the maximum outer boundary of the robot, which is the largest portion of the robot.

In summary, the controller 250 compares the position information of the object sensed by the sensor with the position information of another robot to determine whether the object sensed by the sensor is a robot or an obstacle (S23). Based on the determination that the sensed object is another robot, the controller 250 generates, as a moving path, a path along which the robot moves at a distance of at least the depth information from the object.

Figure 10:
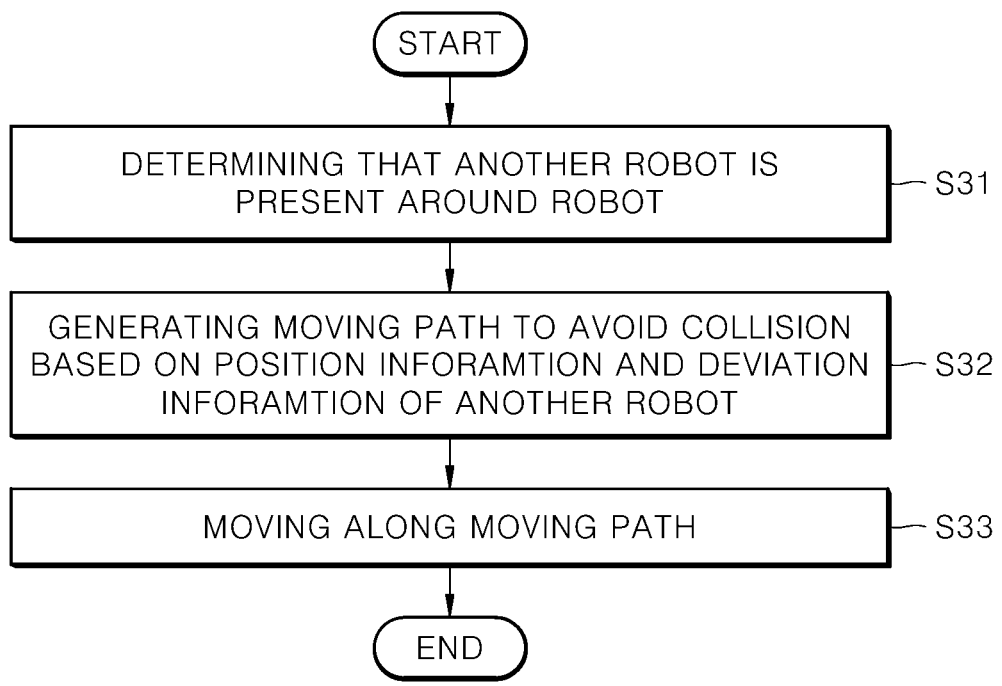
FIG. 10 shows an example process of generating a path to avoid collision between a robot and another robot according to an embodiment of the present disclosure.

FIG. 10 shows an example process of generating a path to avoid collision of a robot with another robot according to an embodiment of the present disclosure. A controller 250 determines that another robot is disposed around the robot (S31). The determination may be performed by the operation of S21 in FIG. 9. A controller 250 generates a moving path to avoid collision based on position information and deviation information of another robot (S32). For example, the controller 250 generates the moving path to avoid the collision with another robot based on the position information and the deviation information of another robot.

The deviation information includes deviation information on the deviation of position of each of the robots. For example, it is assumed that a position deviation range of the robot in a space is 0.5 m. In this case, the first robot may define a deviation range of +/−0.5 m from the position of the second robot. The first robot may also have a current position deviation. Therefore, the controller generates the moving path to avoid the collision based on the deviation.

For example, the controller 250 may generate the moving path based on relative position to the adjacent robots and the deviation information in order to generate an avoidance moving path to prevent the collision with another robot. For example, the first robot may generate a moving path so as to be spaced apart from another robot by a distance calculated by multiplying, by 2, 0.5 m corresponding to the deviation information (or a distance calculated by multiplying 2.5 or more for safety). The robot 1 moves along the moving path generated by the controller 250 (S33).

Figure 11:
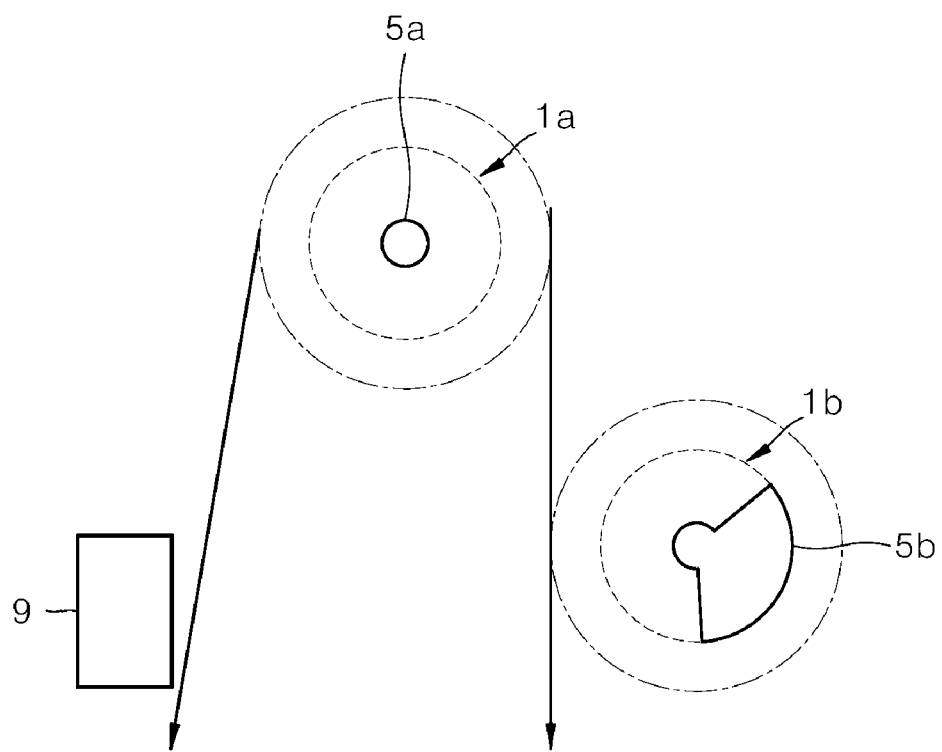
FIG. 11 shows an example process in which a robot generates a moving path based on position information and deviation information of another robot according to an embodiment of the present disclosure.

FIG. 11 shows an example process in which a robot generates a moving path based on position information and deviation information of another robot according to an embodiment of the present disclosure. A first robot 1a is disposed around a second robot 1b and receives position information. A controller 250 of the first robot 1a obtains depth information of a recessed part of the second robot 1b to define a maximum outer boundary range of each of the robots based on the position information and the depth information of the second robot 1b.

In some examples, as the robot has a position deviation, a range of the maximum outer boundary of the robot may be expanded by a current position deviation of the robot. As a result, as shown in FIG. 11, a controller 250 defines a position deviation range of the adjacent robot. As the robot may collide with another robot within this range, the controller 250 may generate a moving path such that the first robot 1a moves within a range between two arrows.

Figure 12:
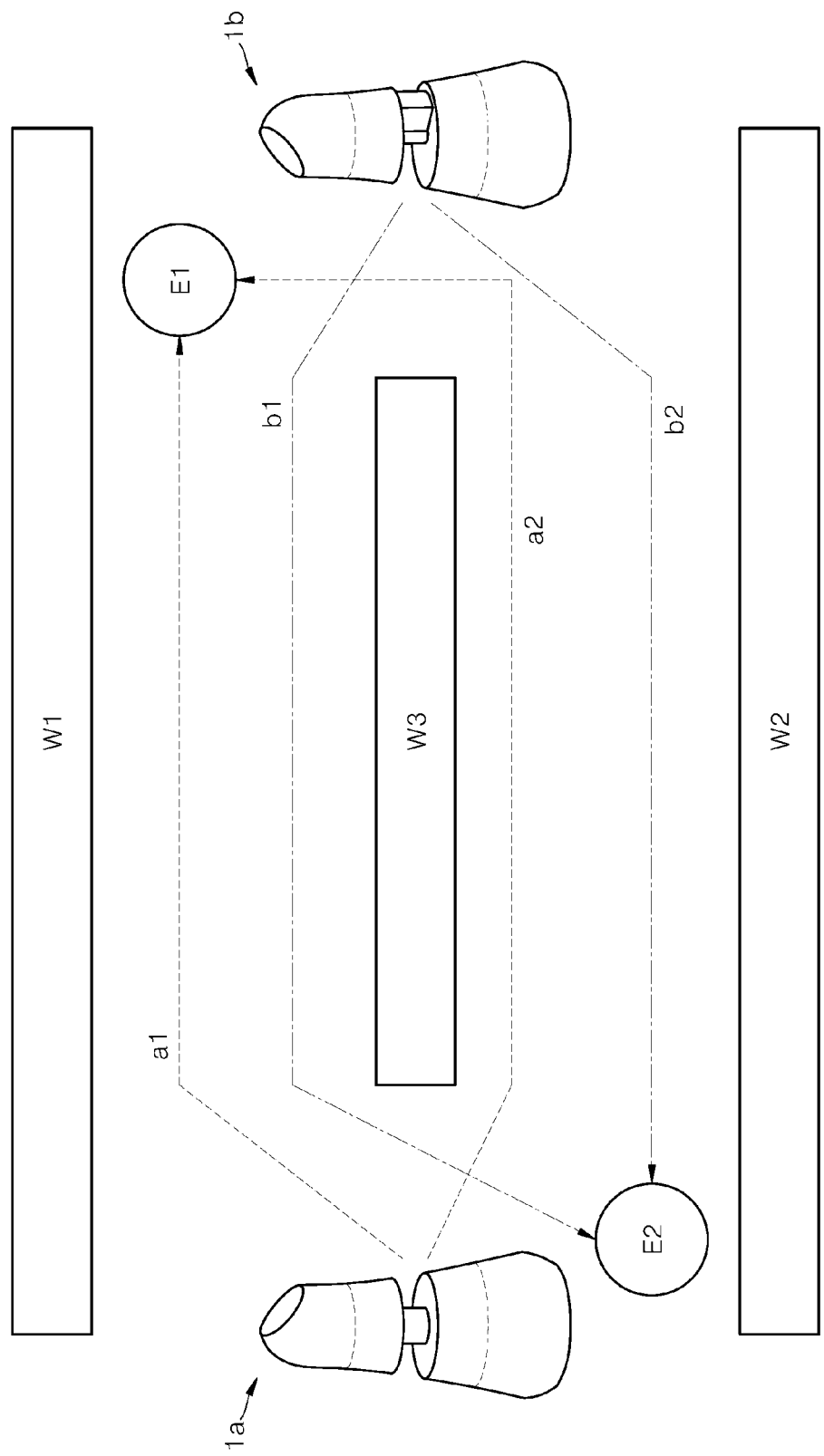
FIG. 12 shows an example process of generating a detour path according to an embodiment of the present disclosure.

FIG. 12 shows an example process of generating a detour path according to an embodiment of the present disclosure. W1, W2, and W3 are fixed obstacles. Each of robots 1a and 1b may have information on a target point to which the robots 1a and 1b move and may receive the information from a server 500. It is assumed that the first robot 1a moves toward a destination of E1 and the second robot 1b moves toward a destination of E2.

An embodiment in which the server 500 adjusts paths of robots is described. A communicator 580 of the server 500 receives global paths of global robots generated by the robots. Alternatively, a server controller 550 of the server 500 may generate the global paths of the robots in advance.

In this case, the server 500 changes the global path of each robot in a region where collision is expected during movement of the robots and transmits information on the changed global path to each robot. Upon receiving the global paths by the robots, the robot changes the path to be the received path. In some cases where detour is present, the server 500 may generate a detour moving path along which the robot moves via the detour.

In FIG. 12, the first robot 1a may select at least one of a moving path a1 passing between W1 and W3 or a moving path a2 passing between W2 and W3 as a path along which the first robot 1a moves toward E1 as a destination. Similarly, the second robot 1b may select at least one of a moving path b1 passing between W1 and W3 or a moving path b2 passing between W2 and W3 as a path moving toward E2 as a destination.

However, the first robot 1a and the second robot 1b may collide with each other between W1 and W3 when the first robot 1a does not identify the position information of the second robot 1b and the second robot 1b does not identify the position information of the first robot 1a, and when the first robot selects the path a1 and the second robot 1b selects the path b1. When the first robot 1a selects the path a2 and the second robot 1b selects the path b2, the robots may collide with each other between W2 and W3.

The server 500 may generate a path of each of the robots to avoid the collision based on the current position and destination information of each of the two robots and may transmit the generated path information to the robots to prevent the collision. In one embodiment, the server 500 transmits information on path a1 to the first robot 1a and information on path b2 to the second robot 1b such that the two robots move without collision.

The server controller 550 generates a first moving path along which the first robot 1a moves, according to priorities of the robots. And the server controller 550 identifies, in a map storage 510, a space where the second robot 1b is not detected during movement of the first robot 1a along a first moving path a1 and generates a second moving path b2 along which the second robot 1b moves. The communicator 580 transmits information on the first moving path a1 to the first robot 1a and information on the second moving path b2 to the second robot 1b such that the two robots may move without collision.

Figure 13:
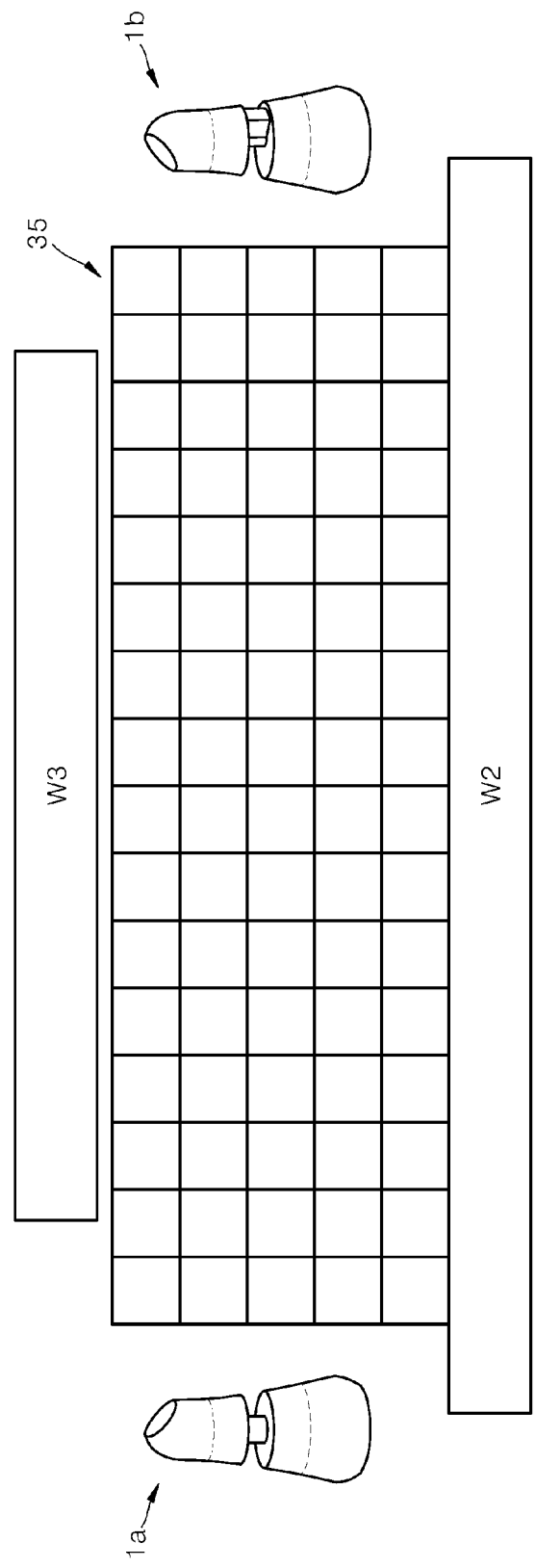

FIGS. 13 and 14 show examples of a process of generating a path to avoid collision according to an embodiment of the present disclosure. In FIG. 12, it is assumed that an obstacle is disposed between W1 and W3 such that path a1/b1 may not be used. In this case, in FIG. 12, the first robot 1a may move along path a2 and the second robot 1b may move along path b2. In some cases where a detour is not present, a server 500 may design a path such that the two robots does not collide with each other.

FIG. 13 is an enlarged view of an area between W3 and W2. A space where two robots may move in the area between W3 and W2 is divided into grids indicated by reference numeral 35. A size of the grid may be generated based on a size of the robot. For example, the size of the grid may be determined based on a maximum contour line (e.g., a maximum outer boundary) of the robot.

A server 500 also generates a path of the robot having a highest priority (assumed as the first robot) among the two robots (e.g., the first robot and the second robot). In this case, the path along which the first robot 1a moves is described with reference to FIG. 14. In reference numeral 35a in FIG. 14, a path along which a first robot 1a moves indicated by grids is shown. The first robot 1a moves along a path indicated by an arrow shown in reference numeral 35a in FIG. 14. Another robot may not move along that path to avoid the collision.

Therefore, when the path is set to the first robot 1a as shown in reference numeral 35a in FIG. 14, the server 500 reconfigures the grids such that other robots may not move along that path. According to an embodiment, as shown in reference numeral 35b in FIG. 14, an obstacle may be disposed in an area allocated to the path of the first robot 1a for a predetermined period of time.

Alternatively, as shown in reference numeral 35c of FIG. 14, grids may be configured or weight for each grid may be changed. For example, a number included in each grid represents suitability of path. The less a number in each of the grids is, the more difficult the grid corresponds to the path. As shown in reference numeral 35c, the server 500 allocates the moving path to the first robot 1a and sets the suitability of the path of the corresponding area to be "0". In addition, as a slight collision may occur during movement of the first robot 1a around the area indicated by "0", the number in each of the grids around the area indicated by "0" is set to be "3". The farther away from the grids assigned as the moving path of the first robot 1a, the higher the suitability may be set. In this case, the server 500 may set a new path of another robot (e.g., the second robot) by reflecting the suitability.

For example, the server 500 divides the map of the collision prediction area into grids of predetermined size, reconfigures a graph with respect to the generated grids, and connects the existing graph thereto. The server 500 sequentially generates the moving paths of the robots based on priorities of the robots which may collide with each other or a speed of entering the space. In this case, the server controller 550 of the server 500 may adjust the weight of the graph generated and occupied by the moving path of the specific robot to guide another path when designing the next path.

In addition to the above-described process, the robot may determine the shape of another robot. In some cases where the recessed part has a specific shape, the controller 250 of the robot may determine whether the detected obstacle is a robot or an obstacle based on contour information, that is, geometry information of the recessed part.

In summary of examples shown in FIGS. 13 and 14, when the two robots, for example, the first robot 1a and the second robot 1b, pass through a same first space, the server controller 550 divides the first space into grids indicated by reference numeral 35 and sets a set value for each grid to be an initial value. The server controller 550 assigns the first area of the grids as a first moving path along which the first robot moves (see reference numeral 35a) and corrects the set value for each grid included in the first area (see reference numeral 35c). In addition, the server controller 550 allocates a second area of the grids except for the first area as a second moving path along which the second robot moves. In this case, the server controller 550 initializes the set values as shown in reference numeral 35c in FIG. 14 after the first robot 1a moves along the first moving path (indicated by the arrow in reference numeral 35a) such that other robots move in a larger space.

Figure 15:
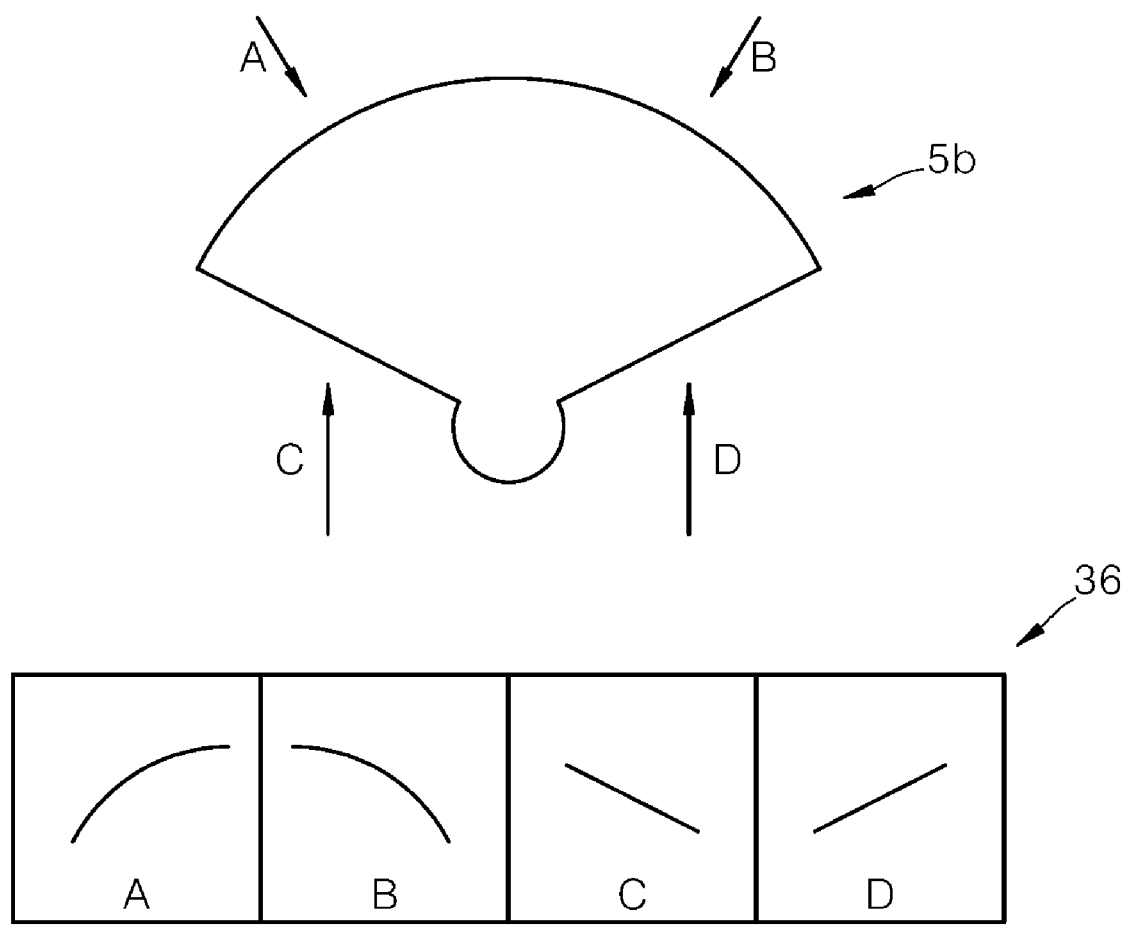
FIG. 15 shows an example process of determining whether a sensed obstacle is a robot through geometry during local navigation according to an embodiment of the present disclosure.

FIG. 15 shows an example of a process of determining a robot using geometry during local navigation according to an embodiment of the present disclosure. A robot 1 may acquire specific geometry during sensing of recessed part of another robot. For example, when another robot senses a recessed part 5b of a robot 1b as shown in FIG. 2, geometry obtained in direction "A", geometry obtained in direction "B", geometry obtained in direction "C", and geometry obtained in direction "D" are shown in reference numeral 36. The controller 250 detects shapes such as A, B, C, and D and may determine whether the sensed obstacle is a robot.

For example, the controller 250 generates a contour of the object based on distance information on the distance from the object sensed by the sensor. The controller 250 compares contour of the recessed part of each of the robots as shown in reference numeral 36 in FIG. 15 with the previously generated contours. If the contour of the recessed part of each of the robots is similar to the previously generated contour within a predetermined deviation range, the controller 250 determines that the sensed object is the robot.

Figure 16:
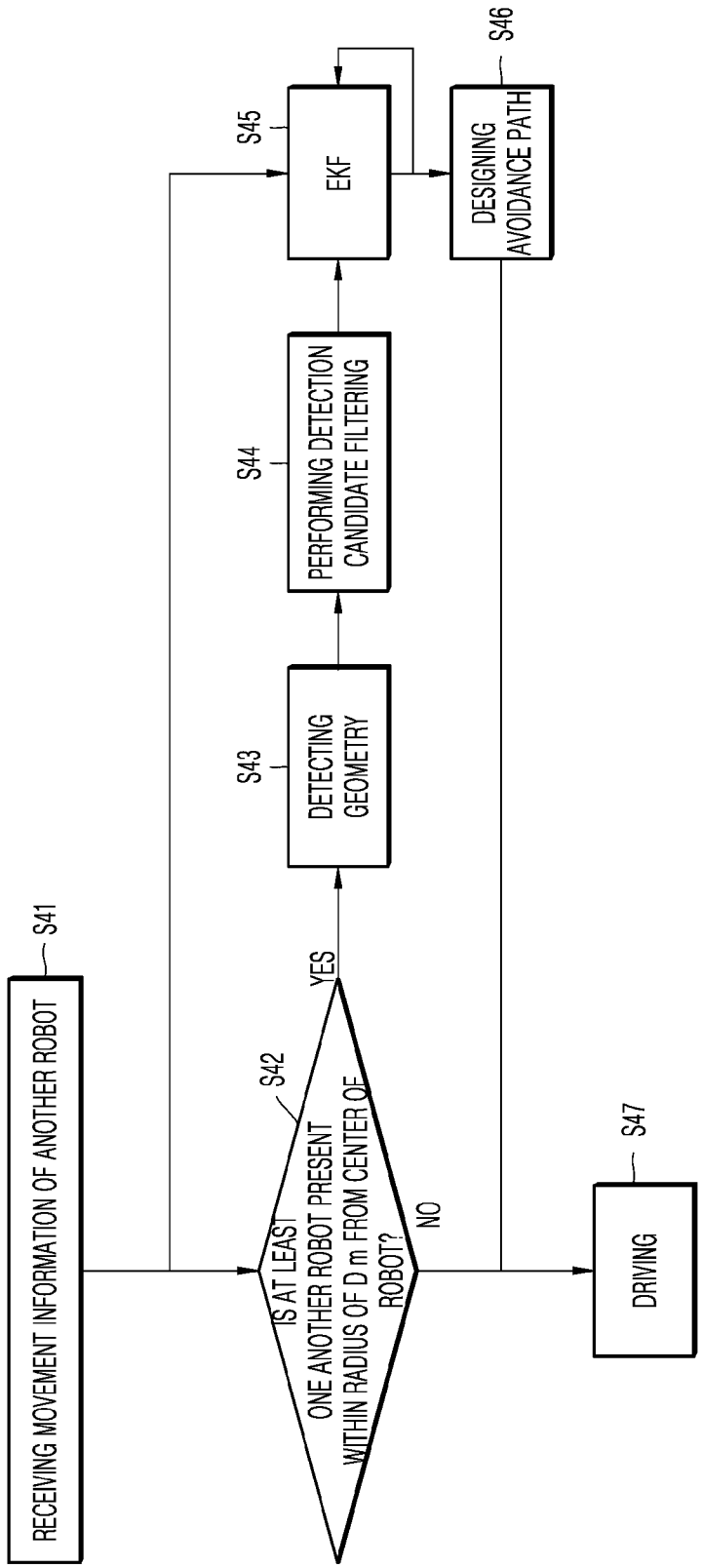
FIG. 16 shows an example process in which a robot identifies another robot according to an embodiment of the present disclosure.

FIG. 16 shows an example process in which a robot identifies another robot according to an embodiment of the present disclosure. The robot receives movement information of another robot disposed adjacent from a server or other robots (S41). A communicator 280 of a robot 1 may receive, from another robot or the server 500, movement information on a state such as a position and a speed of another robot. Alternatively, as the information is received with a predetermined time interval, the controller 250 of the robot 1 may estimate the position or the speed of another robot based on first received information.

As a result, the controller 250 of the robot 1 may determine whether another robot is present around the robot. For example, the controller 250 of the robot 1 determines whether another robot is present within a radius of d meter defined from a center of the robot (S42). If present, the controller 250 detects geometry of surrounding obstacles (S43). The controller 250 detects a geometry element template of each obstacle using a sensor such as a LiDAR sensor 220 within a predetermined range of a position estimate. Within a certain range refers to within a range of moving direction or moving distance of the robot, for example, a range of region of interest (ROI).

Templates may be combined in one or multiple. The controller 250 determines that the detected obstacles are candidates of the robot and determines the positions of the detected candidates and speed as state measuring value. In this case, the controller 250 may set definitions of the measured value and the estimate differently.

The controller 250 performs detection candidate filtering used to exclude candidates having a speed difference from a speed of the detected obstacle by a predetermined threshold value or more (S44). Thereafter, the controller 250 uses a filter algorithm such as an extended Kalman filter to update the estimate for the state of each candidate. Based on the updated result, the controller 250 identifies the robot among the candidates and designs an avoidance path (S46). Subsequently, the robot 1 moves (S47).

If UWB transmission and reception between robots may be performed in this process, a value of distance between the robots measured through the UWB may be added to the state. In this case, position deviation of the robot may be significantly reduced. The controller 250 identifies an object having a movement state within a predetermined deviation from another robot, among one or more objects sensed by the sensor, at S44 and S45.

The controller 250 also analyzes an image photographed by the camera sensor 230 to improve accuracy in determining whether the object corresponds to the robot. For example, the controller 250 may store images of robots operating in the same space. The controller 250 compares the photographed image with images of the stored robots to determine whether an adjacent object is a robot.

Figure 17:
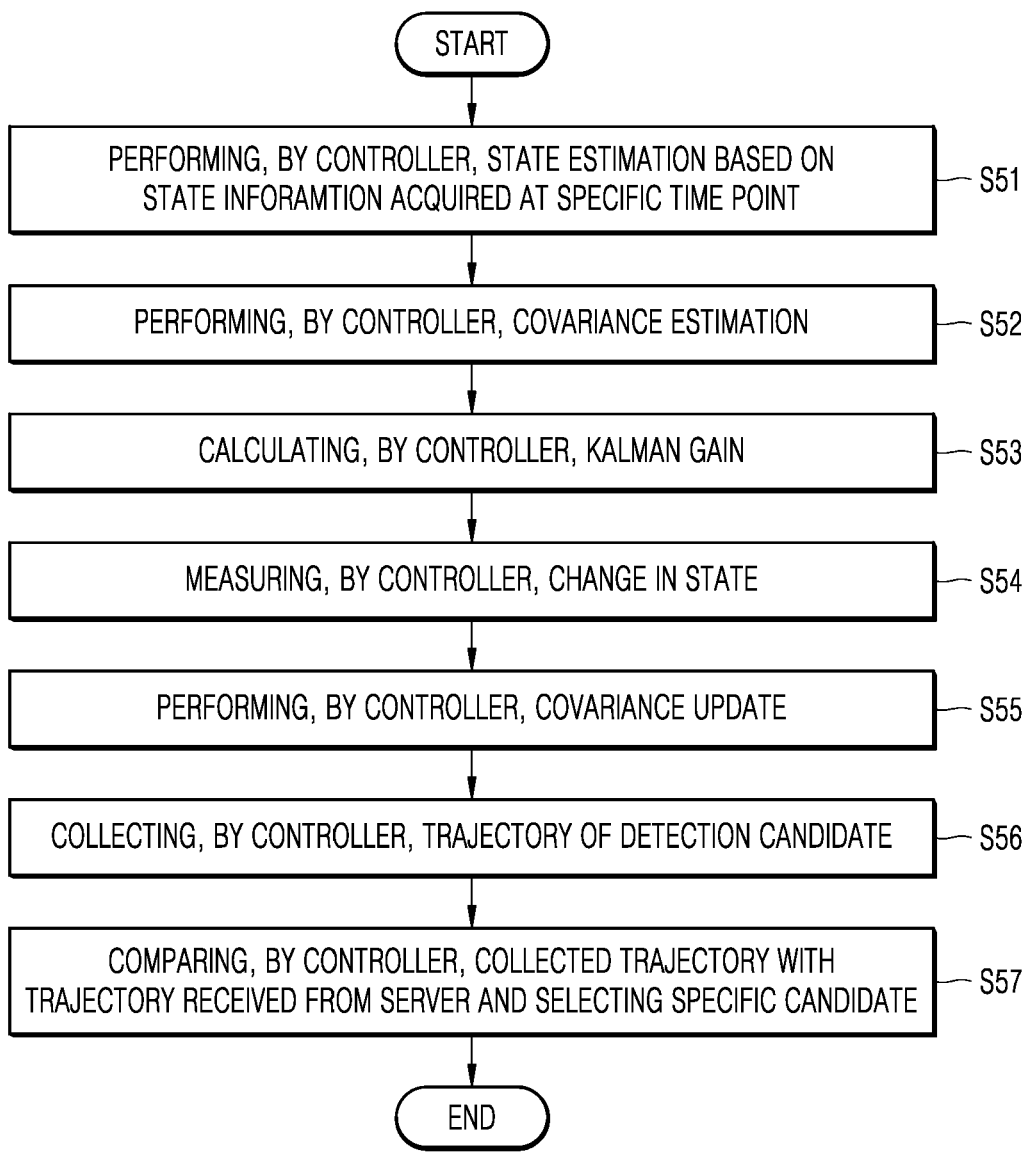
FIG. 17 is a flowchart illustrating an example process of using an extended Kalman filter by a controller according to an embodiment of the present disclosure.

FIG. 17 is a flowchart showing an example process of using an extended Kalman filter by a controller according to an embodiment of the present disclosure. A state may be defined as in Equation 1.

$$x = \begin{bmatrix} x \\ y \\ \dot{x} \\ \dot{y} \end{bmatrix} \qquad \text{[Equation 1]}$$

Variable x on the left side refers to a state. The expression x/y in a matrix at a right side refers to a position of each of candidates that may be determined as robots. The expression $\dot{x}/\dot{y}$ in the matrix represents a speed of the candidate that may be determined as the robot A controller 250 performs state estimation using the state x (S51). Subsequently, the controller 250 performs covariance estimation (S52). In one embodiment, covariance prediction includes "error covariance estimation". The state estimation and the covariance prediction are performed as shown in Equation 2.

$$x = Ax \quad \text{[Equation 2]}$$

$$A = \begin{bmatrix} 1 & 0 & dt & 0 \\ 0 & 1 & 0 & dt \\ 0 & 0 & 1 & 0 \\ 0 & 0 & 0 & 1 \end{bmatrix}$$

$$P = APA^T + Q$$

Subsequently, the controller 250 calculates a Kalman gain (S53) and performs an updated state measurement (or state update measurement) (S54). The controller 250 performs the covariance update (S55). An example of performing the covariance update includes performing "error covariance update".

The process of S53 to S55 may be performed as shown in Equation 3.

$$H = I$$

$$G = PH^T(HPH^T + R)^{-1}$$

$$x = x + G(z - Hx)$$

$$P = (I - GH)P(I - GH)^{-1} + GRG^T \quad \text{[Equation 3]}$$

Subsequently, the controller 250 collects a trajectory of each of the candidates (S56). The controller 250 collects a trajectory of each candidate for a certain period of time (e.g., for several seconds or for several frames). In this process, the robot 1 may also receive the trajectory from the server.

The controller 250 compares the collected trajectories of the candidates with the trajectories received from the server. For example, the controller 250 compares scores (Si) for the trajectory of each of the candidates. The controller 250 selects a specific candidate having a highest score (S57).

Equation 4 lists the trajectories of candidates calculated by the robot and the trajectories received from the server. Equation 5 shows a process of comparing the trajectories of these candidates with the trajectories received from the server. d is calculated by subtracting trajectory T0 of a server from the trajectory of each of the candidates. Si is a reciprocal number of d corresponding to the difference value. The less the value d (corresponding to the difference value), the greater Si. As a result, the trajectory with the least Si is calculated as a Sel value.

Trajectory $T1$ of candidate $1 = [p0, v0, p1, v1, \ldots, pt, vt]$

Trajectory $T2$ of candidate $2 = [p0, v0, p1, v1, \ldots, pt, vt]$

. . .

Trajectory $T0$ received from the server $= [p0, v0, p1, v1, \ldots, pt, vt]$ [Equation 4]

$$d = \|T_i - T_0\|$$

$$S_i = 1/d$$

$$Sel = \mathrm{argmax}_i S_i \quad \text{[Equation 5]}$$

When the above-described embodiments are applied, autonomous robot in a large area may avoid the collision with another robot. In particular, as the sensors (e.g., LiDAR sensors) mounted on the robots are disposed at the same height, and even when the sensors are disposed on the recessed part, the robot may distinguish the obstacle from another robot, accurately sense the size of another robot, thereby avoiding the collision.

To this end, the robot receives information on the position or speed of the robot from another robot or a server through wireless communication. The controller 250 of the robot solves the collision between the robots using the position deviation value of the robot on the map, which is estimated using the SLAM algorithm. In some examples, the controller 250 determines the shape of the robot disposed in the vicinity, estimates the position/speed information, and updates the accurate movement information of another robot in combination with the received localization information.

AI technology can be used for the robot 1, and the robot 1 can include a guide robot, a transport robot, a cleaning robot, a wearable robot, an entertainment robot, a pet robot, an unmanned flying robot, and the like. The robot 1 can include a robot controller that controls operation, and the robot controller can refer to software or a chip implemented as hardware.

The robot 1 obtains state information related to the robot 1 based on sensor information obtained from various types of sensors or detects (or recognizes) the surrounding environment and an object or generates map data, or determines a moving route and travel plans of the robot, or determines response to user interaction, or determines operation of the robot.

The robot 1 can use sensor information acquired from at least one sensor among a LiDAR, a radar, and a camera to determine a movement route and travel plans of the robot 100. The robot 1 can perform the above operations using a learning model including at least one ANN. For example, the robot 100*a* can recognize a surrounding environment and an object using a learning model and can determine operation of the robot 100*a* based on the recognized surrounding environment information or object information. The learning model can be directly learned by the robot 100*a* or can be learned by an external device such as the server 500.

In this situation, the robot 1 can perform operation of the robot 1 by generating a result using a direct learning model and can also perform the operation of the robot 1 by transmitting sensor information to the external device such as the AI server or server 500 and receiving the generated result thereof. The robot 1 determines a moving route and travel plans of the robot 1 based on at least one of map data, object information detected from sensor information, or object information obtained from an external device, and controls the driver to determine the moving route and the travel plans of the robot 1 to travel the robot 100.

The map data can include object identification information on various types of objects disposed in the space where the robot 1 moves. For example, the map data can include object identification information related to fixed objects such as walls and doors and movable objects such as flower pots and desks. The object identification information can include a name, a type, a distance, a position, and the like.

In some examples, the robot 1 can control the driver based on the control/interaction of the user, to thereby perform operation or travelling of the robot 100. In this situation, the robot 1 can obtain intention information related to the interaction determined based on the user's operation or voice utterance, and determine the response based on the obtained intention information to perform the operation of the robot 100.

In some examples, the robot 1 performs autonomous driving, and in this process, the AI technology is applied, and can include a mobile robot, a vehicle, an unmanned flight vehicle, and the like. The autonomous robot 1 can include an autonomous driving control portion that controls a function for the autonomous driving, and the autonomous control portion can refer to software or a chip implemented as hardware. The autonomous driving controller can be included in the robot 1 as a component of the autonomous robot 1 and the autonomous driving controller is provided as additional hardware outside of the robot 1 to be connected thereto.

The autonomous robot 1 can obtain state information related to the autonomous robot 1 based on sensor information obtained from various types of sensor or can detect (or recognize) the surrounding environment and an object or can generate map data or can determine a travel route and travel plans of the robot 100, or can determine operation of the robot 100. The autonomous robot 1 can use sensor information obtained from at least one sensor among a LiDAR, a radar, and a camera, similar to the robot 100, in order to determine the movement route and travel plans of the robot 100. In particular, the autonomous robot 1 can recognize the environment with respect to or the objects disposed in invisible areas or areas having a predetermined distance or more by receiving the sensor information from the external devices or can receive information directly recognized by the external devices.

The autonomous robot 1 can perform the above operations using a learning model including at least one ANN. For example, the autonomous robot 1 can recognize a surrounding environment and an object using a learning model and can determine a driving line of the robot based on the recognized surrounding environment information or object information. The learning model can be learned directly by the autonomous vehicle 100*b* or can be learned by an external device such as the server 500. In this situation, the autonomous robot 1 can perform operation by generating a result using a direct learning model and can also transmit sensor information to an external device such as an server 500 and can receive the generated result to perform the operation of the robot 100.

The autonomous robot 1 determines a movement route and travel plans of the autonomous robot 1 based on at least one of map data, object information detected from sensor information, or object information obtained from an external device, and controls the driver to travel the autonomous travelling robot 1 along the determined movement route and according to travelling plans of the robot 100.

The map data can include object identification information related to various types of objects disposed in a space (e.g., a road) where the autonomous vehicle 100*b* travels. For example, the map data can include object identification information related to fixed objects such as street lights, rocks, buildings, and movable objects such as vehicles and pedestrians. The object identification information can include a name, type, a distance, a location, and the like.

In some examples, the autonomous robot 1 can control the driver based on control/interaction of the user to perform operation of the robot 1 or travel. In this situation, the autonomous robot 1 can obtain the intention information related to the interaction based on operation of the user or voice utterance, and determine the response based on the obtained intention information to perform the operation thereof.

In some examples, the robot 1 can use the AI technology and autonomous driving technology, and can include guide robots, transport robots, cleaning robots, wearable robots, entertainment robots, pet robots, unmanned flying robots, and the like.

The robot 1 that performs a function for autonomous driving can be collectively referred to as a device that moves along a given moving line of the robot 1 without control of the user or moves by determining the moving line of the robot 1 by itself. The robot 1 that performs a function for autonomous driving can use a common sensing method to determine at least one of a moving route or travelling plans of the robot 100. For example, the robot 1 that performs the autonomous driving function can determine at least one moving route or travelling plans of the robot 1 based on the information sensed by a LiDAR, a radar, and a camera.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

Other embodiments are within the scope of the following claims. The present disclosure is described to solve the above-described problem and provides a robot that may distinguish an obstacle from a robot in a process of sensing and moving an object in a space, thereby avoiding collision between the two robots. The present disclosure also provides a robot configured to receive information on another robot and estimate a position of another robot to avoid collision between the two robots. The present disclosure further provides a server configured to collect position information of robots and generate a moving path to avoid collision between the robots.

Aspects of the present disclosure are not limited to what has been described. Additionally, other aspects that have not been mentioned may be clearly understood from the following description and may be more clearly understood from embodiments. Further, it will be understood that the aspects of the embodiments of the present disclosure may be realized via means and a combination thereof that are described in the appended claims.

According to an embodiment of the present disclosure, a robot may include a sensor configured to sense a distance between the robot and an object disposed outside of the robot, a communicator configured to receive position information of a second robot from a server or the second robot, and a controller configured to generate a moving path to avoid collision with the second robot based on at least one of the position information of the second robot and distance information on the distance sensed by a sensor and depth information of a recessed part of the second robot.

According to an embodiment of the present disclosure, the controller of the robot may compare position information of the object with the position information of the second robot sensed by the sensor to determine whether the object sensed by the sensor is the second robot or an obstacle. According to an embodiment of the present disclosure, the controller of the robot may generate, as a moving path, a path along which the robot moves at a distance of at least the depth information from the object when the object sensed by the sensor is the second robot.

According to an embodiment of the present disclosure, the controller of the robot may generate a contour of the object based on distance information on distance from the object, which is sensed by the sensor, and the controller may compare contour of the recessed part of the second robot with the generated contour of the object to determine that the object is the second robot.

According to an embodiment of the present disclosure, the server may include a communicator configured to receive position information of at least two robots and a server controller configured to calculate positions of robots and to determine a possibility of collision between at least two robots, received by the communicator, to generate a detour moving path of each of the robots or generate a moving path along which the robots move spaced apart in a same space by a maximum separation distance.

According to an embodiment of the present disclosure, a method for avoiding a collision by a robot may include sensing, by a sensor of the robot, a distance between the robot and an object disposed outside of the robot, receiving, by a communicator of the robot, position information of a second robot from a server or the second robot, and generating, by a controller of the robot, a moving path to avoid collision with the second robot based on at least one of the position information of the second robot and distance information on the distance sensed by the sensor and depth information on a recessed part of the second robot.

When embodiments of the present disclosure are applied, the robot may distinguish the obstacle from the robot based on information on speed, position, or appearance of another robot while the robot detects an object and moves in a space, thereby avoiding collision between the two robots.

In addition, when embodiments of the present disclosure are applied, the robot may receive information on another robot from a server or another robot. In addition, when embodiments of the present disclosure are applied, the robot may avoid the collision by estimating the position of another robot. In addition, when embodiments of the present disclosure are applied, the server that collects the position information of the robot may generate a moving path to avoid the collision between the robots. Aspects of the present disclosure are not limited to the above-described ones, and one having ordinary skill in the art to which the disclosure pertains may easily draw various aspects from the configuration of the disclosure.

In certain implementations, a robot comprises: a sensor configured to detect a distance between the robot and an object positioned outside of the robot; a transceiver configured to receive position information of another robot from at least one of a computer or the other robot, the other robot including a recess; and a controller configured to generate a moving path to avoid collision with the other robot based on a depth of the recess of the other robot and at least one of the position information of the other robot or the distance between the robot and the object.

The controller may be configured to compare position information of the object detected by the sensor with the position information of the other robot to determine whether the object detected by the sensor is the other robot or an obstacle, and when the object is the other robot, the controller may be configured to generate the moving path such that the robot moves at a distance of at least the depth of the recess from the object.

The controller may be configured to generate the moving path to avoid the collision with the other robot based on the position information and deviation information of the other robot, wherein the deviation information identifies a distance from the other robot to be maintained while travelling along the moving path. The transceiver may be configured to receive, from the computer, information identifying a portion of the moving path.

The controller may be configured to generate a contour of the object based on distance information identifying respective distances between the robot and portions of the object detected by the sensor, and the controller may be configured to compare a contour of the recess of the other robot with the generated contour of the object to determine whether the object is the other robot.

The transceiver may be configured to receive movement information of the other robot from at least one of the computer or the other robot, and the controller may be configured to identify a particular object among one or more objects detected by the sensor as the other robot when a movement state of the particular object differs from a movement state of the other robot less than by a prescribed difference, and generates the moving path to avoid the particular object based on whether the particular object is the other robot.

The robot may comprise a camera sensor configured to capture an image of the object, wherein the controller is configured to process the image to determine whether the object is the other robot. The robot may further comprise a recess, the sensor may be positioned in the recess of the robot, and the controller may be configured to generate the moving path to avoid collision with the other robot further based on a depth of the recess of the robot.

In certain implementations, a computer may comprise: a memory configured to store information associated with a map of a region; a transceiver configured to receive position information of robots positioned in the region; and a controller configured to: calculate positions of robots and determine a possibility of collision between the robots based on the map and the position information, and generate moving paths along which the robots move in the region to maximize separation distances between the robots based on the positions of robots and the possibility of collision between the robots.

The controller, when generating the moving paths, may be configured to: generate a first moving path along which a first robot of the robots moves, and identify a space where the first robot is not present when travelling along the first moving path and to generate, based on the space, a second moving path along which a second robot of the robots moves; and the transceiver may be configured to transmit the first moving path to the first robot, and transmit the second moving path to the second robot.

When the first robot and the second robot pass through a common space, the controller may be configured to divide the common space into grids and set values for the grids, and controller may be configured to allocate a first subset of the grids as the first moving path along which the first robot moves, update the values for grids based on allocating the first subset of the grids, and allocate a second subset of the grids that differs from the first subset of the grids as the second moving path along which the second robot moves based on the updated values for the grids.

The controller may be configured to reset the values of the first subset of the grids after the first robot moves along the first moving path. At least one of the robots may include a recess, and the controller may be configured to further generate at least one of the moving paths based on a depth of the recess.

In certain implementations, a method may comprise: sensing, by a robot, a distance between the robot and an object; receiving, by the robot, position information of another robot from a computer or the other robot, the other robot having a recess; and generating, by the robot, a moving path to avoid collision with the other robot based on a depth of the recess of the other robot and at least one of the position information of the other robot or the distance between the robot and the object.

The method may further comprise: comparing, by the robot, position information of the object with the position information of the other robot to determine whether the object is the other robot or an obstacle; and generating, by the robot, the moving path along which the robot moves at a distance of at least the depth of the recess from the object when the object is the other robot.

The method may further comprise generating the moving path to avoid the collision with the other robot based on the position information and deviation information of the other robot, wherein the deviation information identifies a distance from the other robot to be maintained by the robot when travelling along the moving path. The method may further comprise receiving, by the robot, information identifying a portion of the moving path from the computer.

The method may further comprise: generating, by the robot, a contour of the object based on distances between the robot and portions of the object; and comparing, by the robot, a contour of the recess of the other robot with the generated contour of the object to determine whether the object is the other robot.

The method may further comprise: receiving, by the robot, movement information of the other robot from the computer or the other robot; and identifying, by the robot, a particular object, among a plurality of objects detected by the robot, having a movement state that differs from a movement state of the other robot by less than a prescribed difference as the other robot. The method may further comprise: capturing an image of the object; and processing the image of the object to determine whether the object corresponds to the other robot.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a sensor configured to detect a distance between the robot and an object positioned outside of the robot;
a transceiver configured to receive position information of another robot from at least one of a computer or the other robot, the other robot including a recess; and
a controller configured to generate a moving path to avoid collision with the other robot based on the position information of the other robot, the distance between the robot and the object, and a depth of the recess of the other robot.

2. The robot of claim 1,
wherein the controller is configured to compare position information of the object detected by the sensor with the position information of the other robot to determine whether the object detected by the sensor is the other robot or an obstacle, and
wherein, when the object is the other robot, the controller is configured to generate the moving path such that the robot moves at a distance of at least the depth of the recess from the object.

3. The robot of claim 1,
wherein the controller is configured to generate the moving path to avoid the collision with the other robot based on the position information and deviation information of the other robot, and
wherein the deviation information identifies a distance from the other robot to be maintained while travelling along the moving path.

4. The robot of claim 1, wherein the transceiver is configured to receive, from the computer, information identifying a portion of the moving path.

5. The robot of claim 1,
wherein the controller is configured to generate a contour of the object based on distance information identifying respective distances between the robot and portions of the object detected by the sensor, and
wherein the controller is configured to compare a contour of the recess of the other robot with the generated contour of the object to determine whether the object is the other robot.

6. The robot of claim 1,
wherein the transceiver is configured to receive movement information of the other robot from at least one of the computer or the other robot, and
wherein the controller is configured to identify a particular object among one or more objects detected by the sensor as the other robot when a movement state of the particular object differs from a movement state of the other robot less than by a prescribed difference, and generates the moving path to avoid the particular object based on whether the particular object is the other robot.

7. The robot of claim 1, further comprising a camera sensor configured to capture an image of the object,
wherein the controller is configured to process the image to determine whether the object is the other robot.

8. The robot of claim 1, wherein the robot further comprises a recess, the sensor is positioned in the recess of the robot, and the controller is configured to generate the moving path to avoid collision with the other robot further based on a depth of the recess of the robot.

9. A computer comprising:
a memory configured to store information associated with a map of a region;
a transceiver configured to receive position information of robots positioned in the region; and
a controller configured to:
calculate positions of the robots and determine a possibility of collision between the robots based on the map and the position information, and
generate moving paths along which the robots move in the region to maximize separation distances between the robots based on the positions of the robots and the possibility of collision between the robots.

10. The computer of claim 9,
wherein the controller, when generating the moving paths, is configured to:
generate a first moving path along which a first robot of the robots moves, and
identify a space where the first robot is not present when travelling along the first moving path and to generate, based on the space, a second moving path along which a second robot of the robots moves; and
wherein the transceiver is configured to transmit the first moving path to the first robot, and transmit the second moving path to the second robot.

11. The computer of claim 10,
wherein, when the first robot and the second robot pass through a common space, the controller is configured to divide the common space into grids and set values for the grids, and
wherein the controller is configured to allocate a first subset of the grids as the first moving path along which the first robot moves, update the values for grids based on allocating the first subset of the grids, and allocate a second subset of the grids that differs from the first subset of the grids as the second moving path along which the second robot moves based on the updated values for the grids.

12. The computer of claim 11, wherein the controller is configured to reset the values of the first subset of the grids after the first robot moves along the first moving path.

13. The computer of claim 9, wherein at least one of the robots includes a recess, and the controller is configured to generate at least one of the moving paths further based on a depth of the recess.

14. A method comprising:
sensing, by a robot, a distance between the robot and an object;
receiving, by the robot, position information of another robot from a computer or the other robot, the other robot having a recess; and
generating, by the robot, a moving path to avoid collision with the other robot based on the position information of the other robot, the distance between the robot and the object, and a depth of the recess of the other robot.

15. The method of claim 14, further comprising:
comparing, by the robot, position information of the object with the position information of the other robot to determine whether the object is the other robot or an obstacle; and
generating, by the robot, the moving path along which the robot moves at a distance of at least the depth of the recess from the object when the object is the other robot.

16. The method of claim 14, further comprising generating the moving path to avoid the collision with the other robot based on the position information and deviation information of the other robot, wherein the deviation information identifies a distance from the other robot to be maintained by the robot when travelling along the moving path.

17. The method of claim 14, further comprising receiving, by the robot, information identifying a portion of the moving path from the computer.

18. The method of claim 14, comprising:
generating, by the robot, a contour of the object based on distances between the robot and portions of the object; and
comparing, by the robot, a contour of the recess of the other robot with the generated contour of the object to determine whether the object is the other robot.

19. The method of claim 14, further comprising:
receiving, by the robot, movement information of the other robot from the computer or the other robot; and
identifying, by the robot, a particular object, among a plurality of objects detected by the robot, having a movement state that differs from a movement state of the other robot by less than a prescribed difference as the other robot.

20. The method of claim 14, further comprising:
capturing an image of the object; and
processing the image of the object to determine whether the object corresponds to the other robot.

* * * * *